US012249781B2

(12) United States Patent
Andresen et al.

(10) Patent No.: US 12,249,781 B2

(45) Date of Patent: Mar. 11, 2025

(54) AXIALLY RESILIENT PRESSING CONTACT PIN

(71) Applicant: KOSTAL Automobil Elektrik GmbH & Co. KG, Luedenscheid (DE)

(72) Inventors: Norbert Andresen, Schwerte (DE); Ralf Ostermann, Meinerzhagen (DE); Heike Skutta, Schalksmuehle (DE); Frank Kunert, Luedenscheid (DE); Matthias Seifert, Bochum (DE); Edward Ziebko, Werdohl (DE)

(73) Assignee: KOSTAL Automobil Elektrik GmbH & Co. KG, Luedenscheid (DE)

( * ) Notice: Subject to any disclaimer, the term of this patent is extended or adjusted under 35 U.S.C. 154(b) by 401 days.

(21) Appl. No.: 17/944,544

(22) Filed: Sep. 14, 2022

(65) Prior Publication Data

US 2023/0018520 A1 Jan. 19, 2023

Related U.S. Application Data

(63) Continuation of application No. PCT/EP2021/057932, filed on Mar. 26, 2021.

(30) Foreign Application Priority Data

Apr. 1, 2020 (DE) ..................... 10 2020 002 076.3

(51) Int. Cl.

*H01R 13/00* (2006.01)
*H01R 13/17* (2006.01)

(Continued)

(52) U.S. Cl.

CPC ......... *H01R 13/17* (2013.01); *H01R 13/2421* (2013.01); *H01R 13/635* (2013.01)

(58) Field of Classification Search

CPC ... H01R 13/17; H01R 13/635; H91R 13/2421
See application file for complete search history.

(56) References Cited

U.S. PATENT DOCUMENTS 4,548,450 A 10/1985 Reimer et al.
5,281,149 A * 1/1994 Petri ...................... H05K 7/142 439/74

(Continued)

FOREIGN PATENT DOCUMENTS

DE 102006000959 A1 7/2007
DE 102015107535 A1 11/2016

(Continued)

OTHER PUBLICATIONS

European Patent Office, International Search Report for International Application No. PCT/EP2021/057932, dated Jun. 28, 2021.

(Continued)

*Primary Examiner* — Neil Abrams
(74) *Attorney, Agent, or Firm* — Brooks Kushman P.C.

(57) ABSTRACT

An axially resilient press-in contact pin includes a metal body and an electrically conductive, elastic element. The metal body includes a pin-shaped section and a press-in spring. The press-in spring is on a first end of the pin-shaped section. The elastic element surrounds at least portions of the pin-shaped section and extends beyond a second end (i.e., free end region) of the pin-shaped section.

19 Claims, 4 Drawing Sheets

(51) Int. Cl.
*H01R 13/24* (2006.01)
*H01R 13/635* (2006.01)

(56) References Cited

U.S. PATENT DOCUMENTS

| | | | | |
|---|---|---|---|---|
| 5,810,617 | A | 9/1998 | Hasagawa | |
| 6,183,269 | B1 * | 2/2001 | Sarkissian | H01R 13/2442 439/76.1 |
| 6,565,395 | B1 | 5/2003 | Schwarz | |
| 7,452,248 | B2 * | 11/2008 | Seo | H01R 43/16 439/751 |
| 7,503,774 | B2 * | 3/2009 | Yumi | H01R 13/2421 439/940 |
| 7,874,880 | B2 * | 1/2011 | Fedde | H01R 13/2471 439/841 |
| 8,814,577 | B2 * | 8/2014 | Nohira | H01R 43/20 29/842 |
| 9,379,465 | B2 * | 6/2016 | Fujii | H01R 13/2407 |
| 10,720,725 | B2 | 7/2020 | Yao et al. | |
| 11,715,894 | B2 * | 8/2023 | Herges | H01R 12/57 439/81 |
| 2011/0059661 | A1 * | 3/2011 | Inomata | H05K 3/325 439/841 |
| 2023/0018520 | A1 * | 1/2023 | Andresen | H01R 13/2421 |

FOREIGN PATENT DOCUMENTS

| | | | |
|---|---|---|---|
| WO | 2004077623 | A1 | 9/2004 |
| WO | 2020167603 | A1 | 8/2020 |

OTHER PUBLICATIONS

German Patent and Trademark Office, German Search Report for corresponding German Patent Application No. 10 2020 002 076.3, dated Dec. 21, 2020.

The International Bureau of Wipo, International Preliminary Report on Patentability for International Application No. PCT/EP2021/057932 issued Sep. 29, 2022.

* cited by examiner

AXIALLY RESILIENT PRESSING CONTACT PIN

CROSS-REFERENCE TO RELATED APPLICATIONS

This application is a continuation of International Application No. PCT/EP2021/057932, published in German, with an international filing date of Mar. 26, 2021, which claims priority to DE 10 2020 002 076.3, filed Apr. 1, 2020, the disclosures of which are hereby incorporated in their entirety by reference herein.

TECHNICAL FIELD

The present invention relates to an axially resilient press-in contact pin having a metal body and an electrically conductive, elastic element, the metal body including a pin-shaped section and a press-in spring, the elastic element surrounding at least portions of the pin-shaped section and the elastic element extending beyond a free end of the pin-shaped section.

BACKGROUND

DE 10 2006 000 959 A1 describes a metal pin for producing an electrical connection between two opposite arranged printed circuit boards (PCBs). A first press-in spring is formed on a first end of the metal pin and a second press-in spring is formed on a second end of the metal pin. The press-in springs are respectively pressed into the PCBs.

Such a press-in pin cannot be used when one of the PCBs is a conductive foil (or foil conductor). In this case, zero insertion force (ZIF) connectors are often used, which receive and contact an end section of the conductive foil. However, ZIF connectors are relatively expensive, especially when there are only a few electrical connections to be made.

SUMMARY

An object is an easily realizable and particularly cost-effective possibility of producing individual electrical connections between a rigid printed circuit board (PCB) and another contact surface, in particular a conductive foil.

In embodiments, an axially resilient press-in contact pin includes a metal body and an electrically conductive, elastic element. The metal body includes a pin-shaped section and a press-in spring. The press-in spring is on a first end of the pin-shaped section. The elastic element surrounds at least portions of the pin-shaped section. The elastic element extends beyond a second end (i.e., the free end) of the pin-shaped section.

Embodiments of the present invention achieve the above object and/or other objects in that a press-in contact pin includes a press-in spring on a first end thereof whereas an opposite second end thereof is axially resilient and electrically conductive. The press-in spring is insertable into a metallized hole (e.g., metal-plated borehole) in a PCB. The second end of the press-in contact pin is designed to be axially resilient and electrically conductive so that the second end can be elastically placed against a contact surface (e.g., a conductive foil) and may thereby build up a certain contact pressure.

The second end of the press-in contact pin can be formed either by an elastomer body connected to the metal body of the contact pin or by a metal spring element, for example in the form of a helical spring.

BRIEF DESCRIPTION OF THE DRAWINGS

Exemplary embodiments of a press-in contact pin in accordance with the present invention are illustrated and explained in greater detail below with reference to the drawings, which include the following.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
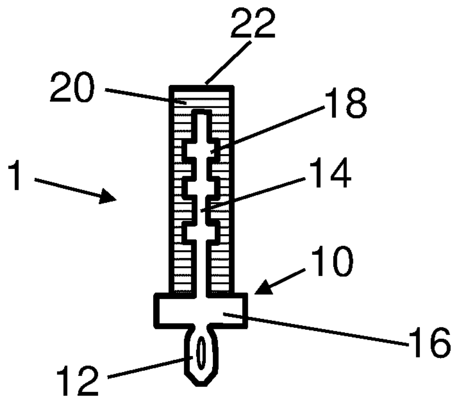
FIG. 1 illustrates a sectional view of a first exemplary embodiment of a first press-in contact pin.

Referring now to FIG. 1, an axially resilient press-in contact pin 1 in accordance with a first exemplary embodiment is shown. An axially resilient press-in contact pin in accordance with embodiments of the present invention may be referred to herein as “axial spring-loaded press-in contact pin”, “press-in contact pin”, “pressing contact pin”, “press-fit contact pin”, and “contact pin”.

Press-in contact pin 1 includes a metal body 10. Metal body 10 includes a first end section and a second end section. The first end section of metal body 10 is formed by a press-in spring or press-in post 12. For example, as shown in FIG. 1, press-in spring 12 is shaped as an eyelet. The second end section of metal body 10 is designed as a pin-shaped section 14. Metal body 10 further includes a transverse web 16 between the first and the second end sections.

Press-in contact pin 1 further includes an electrically conductive, elastomeric body 20. Elastomeric body 20 surrounds and completely encloses pin-shaped section 14 of metal body 10. Elastomeric body 20 is supportable on transverse web 16 of metal body 10. Elastomeric body 20 protrudes in particular beyond the free end of pin-shaped section 14.

Elastomeric body 20 may be produced by over-molding pin-shaped section 14 with an elastomeric material. It is advantageous for pin-shaped section 14 to have a varying cross-sectional width in its longitudinal direction, for example in the form of multiple cross-sectional widenings, resulting in a form-fitting connection between metal body 10 and elastomer body 20. elastomeric body 20 as a whole has relatively good electrical conductivity via a suitably selected electrically conductive filler.

Figure 4:
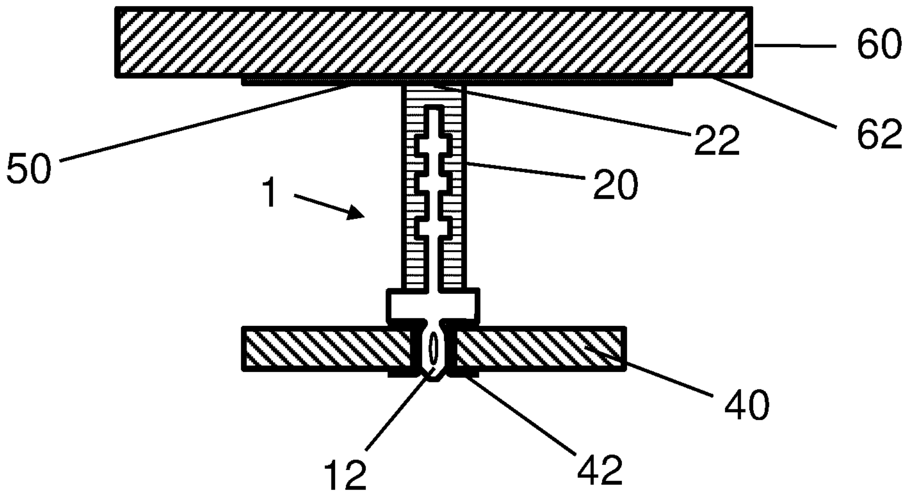
FIG. 4 illustrates a sectional view of an application example of the first press-in contact pin in which the first press-in contact pin produces an electrical connection between a printed circuit board (PCB) and a conductive foil arranged opposite from one another.

Referring now to FIG. 4, with continual reference to FIG. 1, an application example of press-in contact pin 1 is shown. In this application example, press-in contact pin 1 produces an electrical connection between a printed circuit board (PCB) 40 and a conductive foil (or conductor foil) 50 arranged opposite from the PCB.

Here, the end section of press-in contact pin 1 having press-in spring 12 is pressed into a metallized bore or metal-plated borehole 42 in rigid PCB 40 (i.e., press-in spring 12 is pressed into metallized bore 42). The oppositely situated end section of press-in contact pin 1, which is formed by an end face 22 of elastomeric body 20, rests against a second PCB designed as conductive foil 50. Conductive foil 50 is supported here by a section of a housing surface 62 of a housing body 60.

The distance between PCB 40 and conductive foil 50 is set up and/or the overall axial length of press-in contact pin 1 is selected in such a way that elastomeric body 20 is somewhat elastically compressed in the axial direction of press-in contact pin 1, so that end face 22 of elastomeric body 20 come to rest with a certain contact pressure on a contact surface of conductive foil 50.

It is assumed that metallized bore 42 of PCB 40 is connected to electrical or electronic components via conductor tracks on PCB 40. This results in an electrically conductive connection between components on PCB 40 and the contact surface of conductive foil 50 via press-in spring 12, metal body 10, and electrically conductive, elastomeric body 20.

Conductive foil 50 can thus form, for example, contact surfaces of a capacitive proximity sensor system under housing surface 62, it being possible for the components of the associated evaluation electronics to be arranged on PCB 40.

Figure 2:
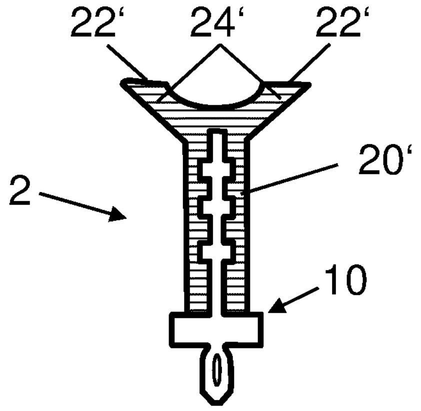
FIG. 2 illustrates a sectional view of a second exemplary embodiment of a second press-in contact pin.

FIG. 2 illustrates a second press-in contact pin 2 in accordance with a second exemplary embodiment. In comparison with press-in contact pin 1 shown in FIG. 1, press-in contact pin 2 makes it clear that the shape of elastomeric body 20' can be varied. Instead of a single end face 22 like elastomeric body 20 in FIG. 1, elastomeric body 20' has two (or more) arms 24' or even a circular ring-shaped plate, each with an end face 22'.

Figure 5:
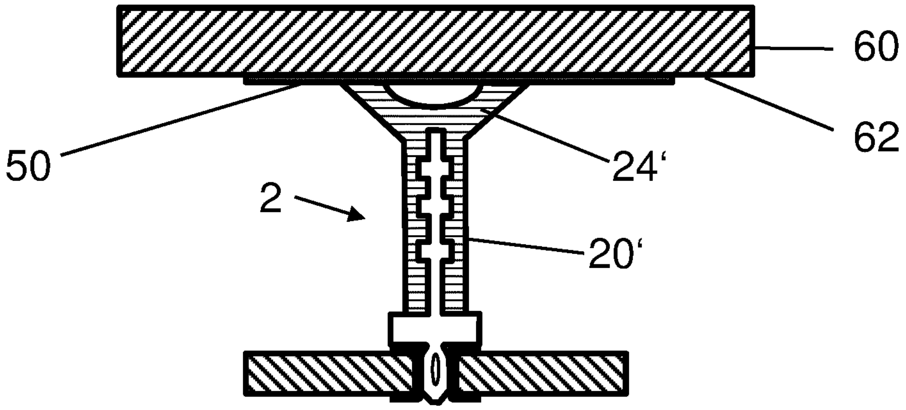
FIG. 5 illustrates a sectional view of an application example of the second press-in contact pin in which the second press-in contact pin produces an electrical connection between the PCB and the conductive foil.

FIG. 5 illustrates an application example in which second press-in contact pin 2 produces an electrical connection between PCB 40 and conductive foil 50. As can be seen from FIG. 5, press-in contact pin 2 can thus concurrently contact multiple locations on conductive foil 50.

Figure 3:
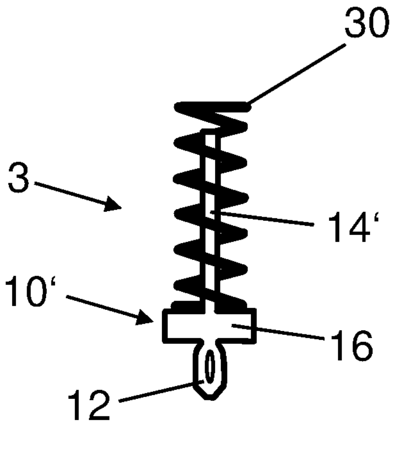
FIG. 3 illustrates a sectional view of a third exemplary embodiment of a third press-in contact pin.

FIG. 3 illustrates a third press-in contact pin 3 in accordance with a third exemplary embodiment. Instead of an elastomeric body such as elastomeric bodies 20 and 20', press-in contact pin 3 includes an elastic element 30 formed by a metal spring element. Particularly, the metal spring element is a metal coil spring.

Pin-shaped section 14' of metal body 10' of press-in contact pin 3 can thus be designed as a simple cylindrical pin and does not require sections with different cross-sectional widths. Coil spring 30 can be fixed by being welded or soldered to crossbar 16 of metal body 10'.

Figure 6:
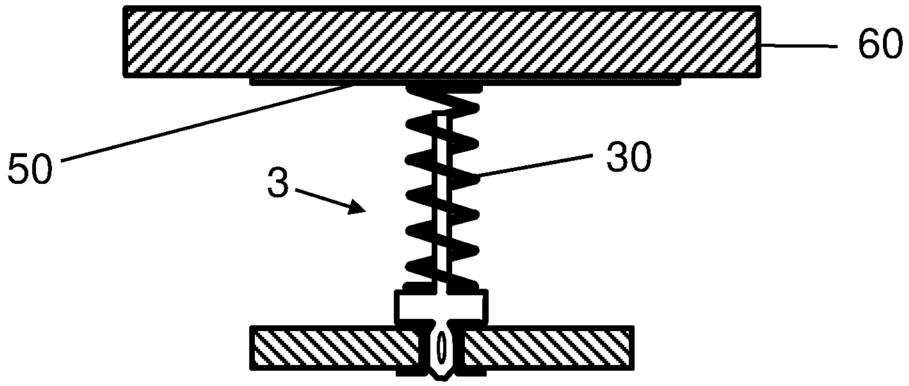
FIG. 6 illustrates a sectional view of an application example of the third press-in contact pin in which the third press-in contact pin produces an electrical connection between the PCB and the conductive foil.

FIG. 6 illustrates an application example in which third press-in contact pin 3 produces an electrical connection between PCB 40 and conductive foil 50.

Figure 7:
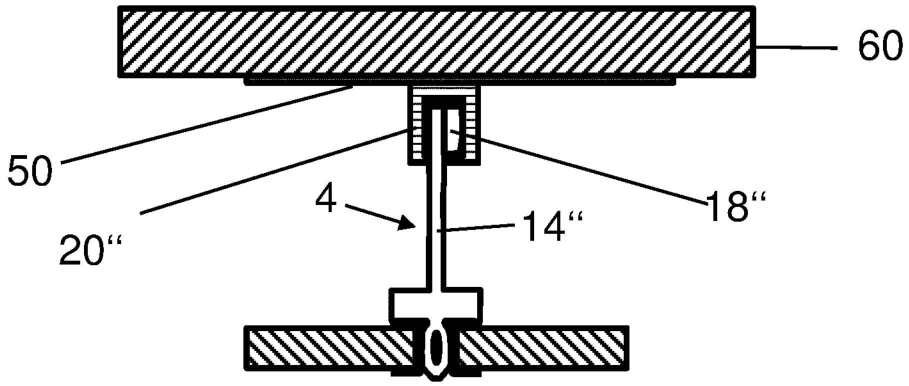
FIG. 7 illustrates a sectional view of an application example of a fourth exemplary embodiment of a fourth press-in contact pin in which the fourth press-in contact pin produces an electrical connection between the PCB and the conductive foil.

FIG. 7 illustrates an application example of a fourth press-in contact pin 4 in accordance with a fourth exemplary embodiment in which press-in contact pin 4 produces an electrical connection between PCB 40 and conductive foil 50. Pin-shaped section 14" of fourth press-in contact pin 4 is folded or rolled up like a screw (helically rolled up) at its free end, thereby forming a cross-sectional widening 18" onto which an elastomeric body 20" can be molded or otherwise attached.

Figure 8:
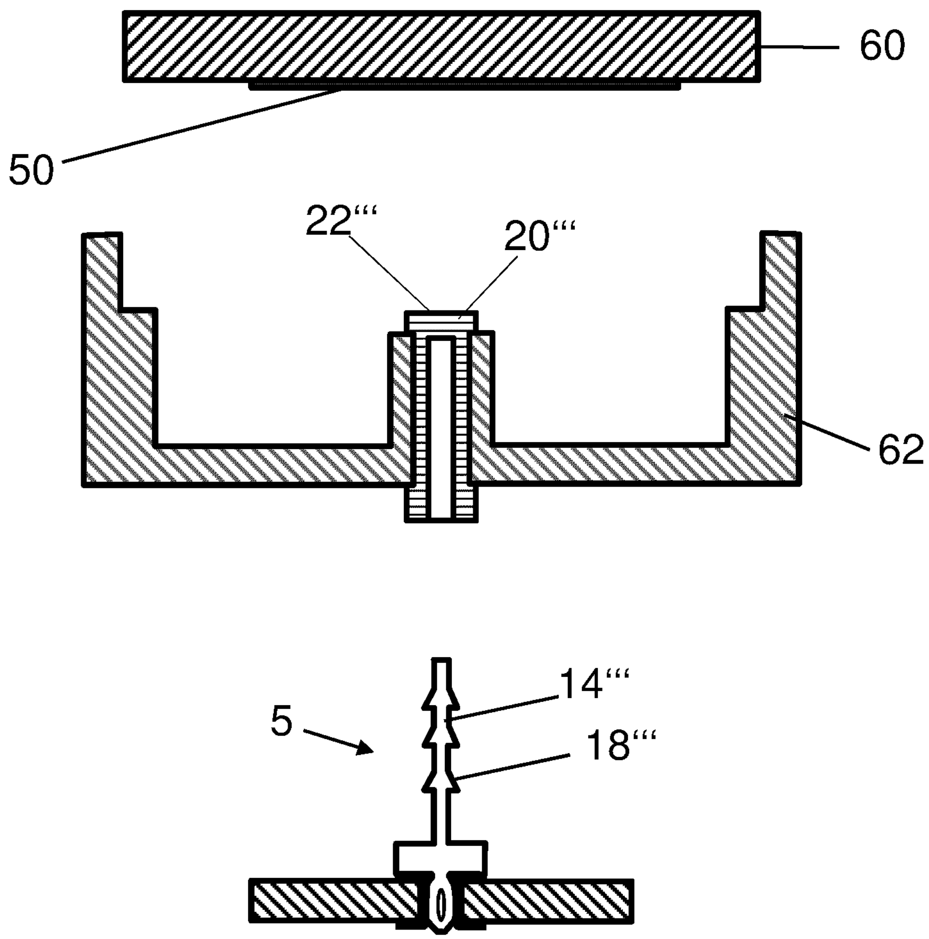
FIG. 8 illustrates a sectional view of an application example of a fifth exemplary embodiment of a fifth press-in contact pin in which the fifth press-in contact pin is to produce an electrical connection between the PCB and the conductive foil.

FIG. 8 illustrates an application example of a fifth press-in contact pin 5 in accordance with a fifth exemplary embodiment in which press-in contact pin 5 is to produce an electrical connection between PCB 40 and conductive foil 50.

Pin-shaped section 14'" of press-in contact 5 has a cross-sectional widening 18" like a Christmas tree. Elastomeric body 20'" is formed here as a sleeve-like individual part, which is preassembled with housing surface 62. When pin-shaped section 14'" is inserted into elastomeric body 20'", the fir-tree-like cross-sectional widening 18'" claws the inner walls of elastomeric body 20'" like a barb. When housing surface 62 is mounted on housing body 60, conductive foil 50 lying against housing surface 62 is pressed against the end face 2'" of elastomeric body 20'" at the same time.

REFERENCE SIGNS

- 1, 2, 3, 4, 5 press-in contact pin
- 10, 10' metal body
- 12 press-in spring (press-fit spring; press-in post)
- 14, 14', 14", 14'" pin-shaped section (pin-type section)
- 16 cross bar (transverse web)
- 18, 18", 18' cross-sectional widenings
- 20, 20', 20", 20'" elastomeric body (elastic element)
- 22, 22', 22'" end face of elastomeric body
- 24 arms
- 30 coil spring (elastic element)
- 40 first printed circuit board
- 42 metallized hole
- 50 second printed circuit board (conductive foil; foil conductor)
- 60 housing body
- 62 housing surface While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An axially resilient press-in contact pin comprising:

a metal body including a pin-shaped section and a press-in spring, the press-in spring being on a first end of the pin-shaped section; and an electrically conductive elastomeric body that surrounds at least portions of the pin-shaped section and that extends beyond a second end of the pin-shaped section.

2. The axially resilient press-in contact pin of claim 1 wherein:

the pin-shaped section is a cylindrical pin.

3. The axially resilient press-in contact pin of claim 1 wherein:

the elastomeric body is over-molded onto the pin-shaped section.

4. The axially resilient press-in contact pin of claim 1 wherein:

the pin-shaped section has cross-sectional widenings.

5. The axially resilient press-in contact pin of claim 1 wherein:

the metal body further includes a cross bar, the cross bar being between the pin-shaped section and the press-in spring.

6. The axially resilient press-in contact pin of claim 1 wherein:

the press-in contact pin is operable for producing an electrical connection between a printed circuit board (PCB) and a conductive foil by the press-in spring being pressed into a bore of the PCB and an end face of a portion of the elastomeric body extending beyond the second end of the pin-shaped section being elastically compressed against the conductive foil.

7. The axially resilient press-in contact pin of claim 1 wherein:

the pin-shaped section has an axial length; and the elastomeric body is axially compressible in a direction along the axial length of the pin-shaped section.

8. The axially resilient press-in contact pin of claim 7 wherein:

the pin-shaped section has at least one cross-sectional widening extending in a direction that intersects the axial length of the pin-shaped section.

9. The axially resilient press-in contact pin of claim 1 wherein:

the elastomeric body completely encloses and directly contacts the pin-shaped section.

10. The axially resilient press-in contact pin of claim 1 wherein:

the elastomeric body overhangs the second end of the pin-shaped section.

11. The axially resilient press-in contact pin of claim 1 wherein:

a portion of the elastomeric body that extends beyond the second end of the pin-shaped section includes a single end-face.

12. The axially resilient press-in contact pin of claim 1 wherein:

a portion of the elastomeric body that extends beyond the second end of the pin-shaped section includes two end-faces.

13. An assembly comprising:

a first printed circuit board (PCB);

a second PCB arranged opposite the first PCB;

an axially resilient press-in contact pin including a metal body and an electrically conductive elastomeric body, the metal body including a pin-shaped section and a press-in spring, the press-in spring being on a first end of the pin-shaped section, and the elastomeric body surrounding at least portions of the pin-shaped section and extending beyond a second end of the pin-shaped section; and wherein the press-in contact pin is axially positioned between the PCBs with the press-in spring being pressed into a bore of the first PCB and an end face of a portion of the elastomeric body extending beyond the second end of the pin-shaped section being elastically compressed against the second PCB whereby the press-in contact pin establishes an electrical connection between the PCBs.

14. The assembly of claim 13 wherein:

the second PCB is a conductive foil.

15. The assembly of claim 13 wherein:

the pin-shaped section has cross-sectional widenings.

16. The assembly of claim 13 wherein:

the pin-shaped section has an axial length; and the elastomeric body is axially compressible in a direction along the axial length of the pin-shaped section.

17. The assembly of claim 16 wherein:

the pin-shaped section has at least one cross-sectional widening extending in a direction that intersects the axial length of the pin-shaped section.

18. The assembly of claim 13 wherein:

the elastomeric body completely encloses and directly contacts the pin-shaped section.

19. The assembly of claim 13 wherein:

the elastomeric body overhangs the second end of the pin-shaped section.

* * * * *